Feb. 19, 1929.  E. G. OAKLEY  1,702,310

METHOD OF MAKING TIRE VALVE STEMS

Filed July 5, 1923  7 Sheets-Sheet 1

Inventor
Erastus G. Oakley
By Henry E. Rockwell
Attorney

Feb. 19, 1929. E. G. OAKLEY 1,702,310
METHOD OF MAKING TIRE VALVE STEMS
Filed July 5, 1923  7 Sheets-Sheet 2

Inventor
Erastus G. Oakley
By Henry E. Rockwell
Attorney

Feb. 19, 1929.

E. G. OAKLEY

METHOD OF MAKING TIRE VALVE STEMS

Filed July 5, 1923

Inventor
Erastus G. Oakley
By Henry E. Rockwell
Attorney

Feb. 19, 1929.  E. G. OAKLEY  1,702,310
METHOD OF MAKING TIRE VALVE STEMS
Filed July 5, 1923   7 Sheets-Sheet 4

Feb. 19, 1929.  1,702,310
E. G. OAKLEY
METHOD OF MAKING TIRE VALVE STEMS
Filed July 5, 1923   7 Sheets-Sheet 5

Inventor
Erastus G. Oakley
By Henry E. Rockwell
Attorney

Feb. 19, 1929.  E. G. OAKLEY  1,702,310

METHOD OF MAKING TIRE VALVE STEMS

Filed July 5, 1923  7 Sheets-Sheet 6

E. G. OAKLEY

1,702,310

METHOD OF MAKING TIRE VALVE STEMS

Filed July 5, 1923     7 Sheets-Sheet 7

Inventor
Erastus G. Oakley
By Henry E. Rockwell
Attorney

Patented Feb. 19, 1929.

1,702,310

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

METHOD OF MAKING TIRE-VALVE STEMS.

Application filed July 5, 1923. Serial No. 649,666.

This invention relates to the manufacture of so-called tire valve stems or casings, and more particularly to a valve stem designed for use with pneumatic tires, the invention being particularly concerned with the tube or casing in which the valve proper is mounted. In the past, such stems or casings have usually been manufactured from a piece of solid bar stock. In the process of manufacturing the casings from material of this character, it is necessary to drill an opening through the entire length of the bar, in order to provide for the admission of air to the tire, after the stem has been connected therewith. For many reasons, a valve stem made by this prior method possesses certain inherent defects and disadvantages, among which are lack of tensile strength, a weak point of connection between the body of the stem and the broadened base portion formed when the blank is headed, and a relatively large wastage of material and a lack of economy in the process of manufacture. In practicing my improved process, I propose to make the valve stems or casings from hollow shells or tubes, and I prefer to form these tubes from a sheet metal blank by a series of drawing operations. By my method, the casings or shells may be made substantially in their finished form by a series of such operations, thus doing away with more expensive mechanical processes or hand work in their manufacture.

More specifically, the completed valve stem in common use at this time comprises an elongated tubular body provided with a reduced upper end and a flat head upon its lower end, the head joining the body portion by a reduced neck. This body has an opening extending entirely through it and in the opening is provided a projecting shoulder, upon which the valve proper may seat. The elongated body is threaded externally, and the upper reduced end is provided with both interior and exterior threads, and generally the body portion is also provided with opposite flat sides. By my improved method, I propose to form by a series of drawing operations, a flat sided tubular casing or shell provided with a reduced upper end, both the body portion and the end of the blank being given the cross sectional dimensions desired in the finished article. The blank may then be headed by the folding outwardly of the upper portion of the casing and drawing the metal in said folded portion to form a thickened disk-like base or head, disposed transversely of the body portion of the shell and having an opening therein which is a continuation of the opening through the shell.

One object of my invention is to obviate the disadvantages present in prior processes of manufacture, by providing for the manufacture of a tire valve stem by a series of drawing operations which may be economically performed.

Another object of my invention is to provide an economical method for manufacturing devices of this character, which, at the same time, produce a tire valve stem of superior strength and quality.

A still further object of my invention is the provision of a tire valve stem which may be made cheaply and without undue wastage of material, and which will, at the same time, possess all of the advantages of and be superior to articles of this kind now in use.

A particular feature of the present invention is the production of a tire valve stem from a drawn sheet metal shell, having a single ply base formed by folding over and thickening a part of the wall of the shell.

To these and other ends, the invention consists in the novel features and combinations of steps to be hereinafter described and claimed.

The particular valve stem which I have shown in the drawings as produced by my improved method, comprises a tubular body portion 10, provided with flat sides 11 and joining a relatively broad disk-like base 12 by a reduced portion or neck 13, formed by an annular exterior groove upon the body portion adjacent the base. At the upper end, the body 10 is reduced in size and threaded as at 14 to receive the usual valve cap (not shown) and the body is also usually threaded throughout its length as at 15, in order that a dust cap may be secured upon the stem. A longitudinal bore 16 extends entirely through the body and also through the upper neck and the lower base, and within this bore may be provided a projecting shoulder 17 to serve as a support for the valve structure 18.

Figures 1, 2, 3, 4, 5, 6, 7:
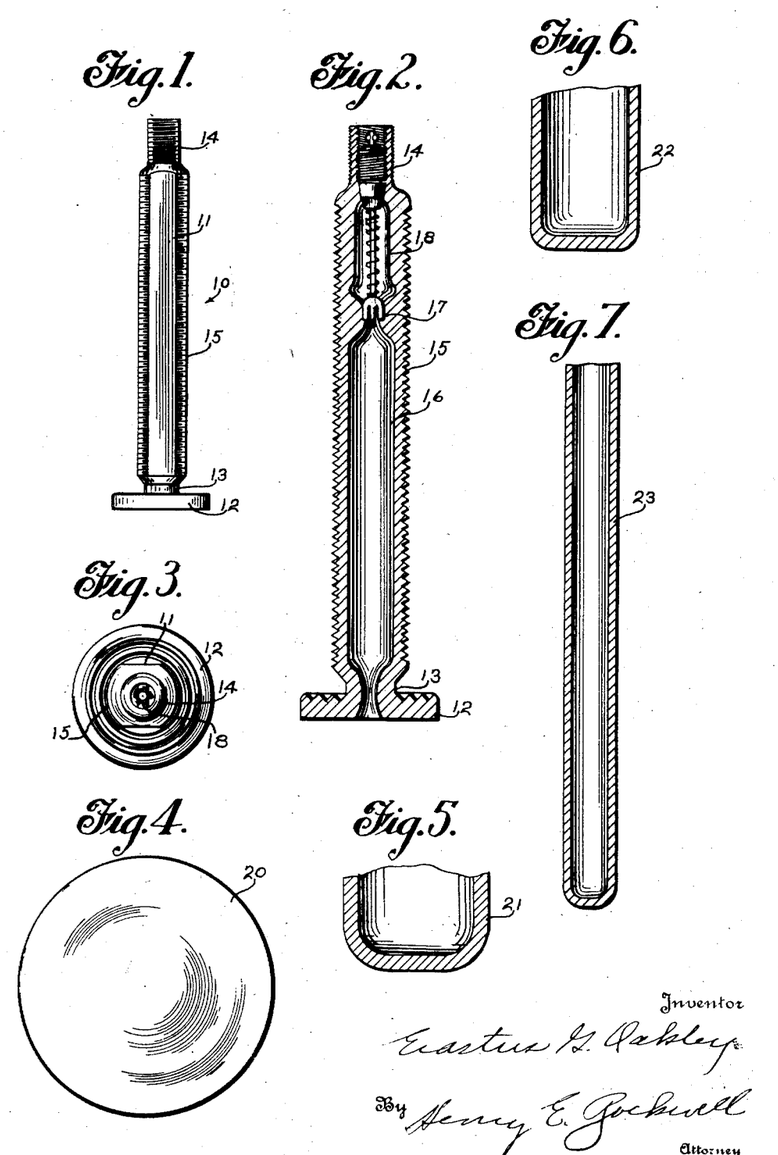
Fig. 1 is a side elevational view of a tire valve stem embodying my invention.
Fig. 2 is a sectional view of the same, showing the valve proper mounted therein.
Fig. 3 is a top plan view of the stem shown in Fig. 2.
Fig. 4 is a plan view of a blank in the form of a sheet metal disk from which the casing is made.
Figs. 5, 6 and 7 are sectional views showing the shell in successive stages of manufacture.

According to the preferred embodiment of my method, which I have chosen to illustrate and describe, the valve stem is formed from a hollow shell or tube drawn from a blank of sheet metal of proper gauge, shown at 20, in Fig. 4. This blank or disk of sheet metal is placed in a suitable drawing press and cupped as shown at 21, in Fig. 5. The blank is then, by succeeding drawing operations, drawn out or elongated and reduced in diameter through the stage shown at 22, in Fig. 6, until as shown at 23, at Fig. 7, it is given throughout its length the diameter which is desired in the body of the finished article, i. e., the external diameter of the tube 23 should be that of the threaded body of the valve stem 10, shown in Fig. 1.

Figure 8:
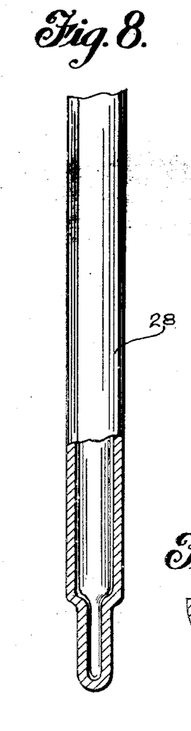
Fig. 8 is an elevational view, partly in section, of the shell after the reduced neck is formed at one end thereof.

While the exact order of performance of the described steps is not always important, I prefer next to reduce the closed end of the blank to form the upper reduced end of the stem. For this purpose, I prefer to use a drawing press of the form shown in Fig. 20, wherein the blank 23 is placed in the opening 24 of a suitable die 25 and operated upon by the punch 26 provided with a suitably shaped tool projection 27 upon its lower end. When the blank has been operated upon by the punch 26 it assumes the form shown at 28, in Fig. 8. The forming of the reduced neck upon the blank is not limited to one operation but may and usually will be made by a series of drawing operations, of which that shown in Fig. 20 will be the final or finishing one.

Figure 9:
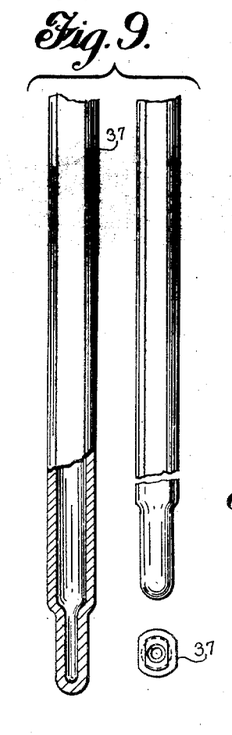
Fig. 9 comprises two side elevational views taken at right angles to each other and a plan view of the blank after a further drawing operation, during which opposite flat sides are formed upon the tube or shell.
Figures 19, 21:
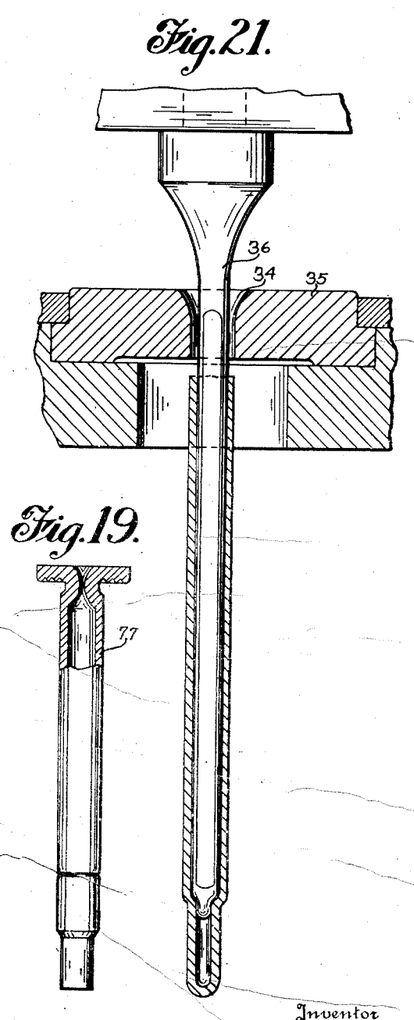
Fig. 19 is a view similar to Fig. 18, illustrating the appearance of the blank after the annular grooves or channels have been cut in the upper surface of the base.
Fig. 21 is a view similar to Fig. 20, showing the operation of drawing the flat sides upon the blank.

The hollow shell is still circular in cross section, and as shown in Fig. 21, may be drawn through the die opening 34 in a suitable die 35, by means of the punch 36, during which operation are formed the opposite flat sides shown at 37, in Fig. 9. The die opening 34 and punch 36 are, of course, properly shaped to bring about the required change in the cross sectional shape of the shell.

Figure 22:
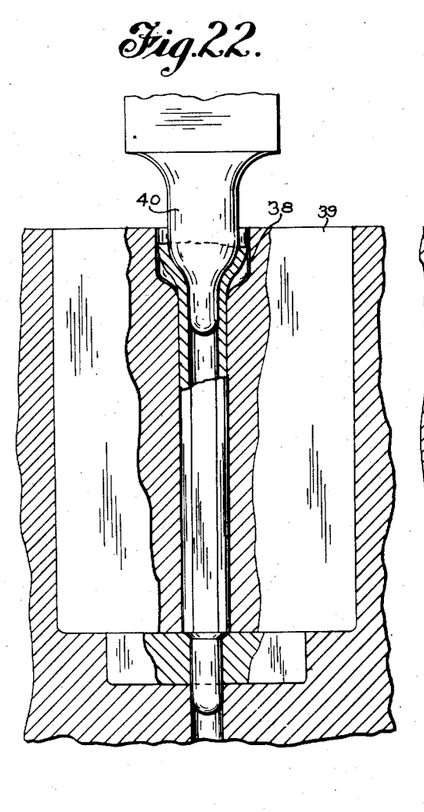
Figs. 22 and 23 are similar views showing the operation of flowing outwardly or flaring the upper part of the shell wall preparatory to forming the disk-like base.
Figure 23:
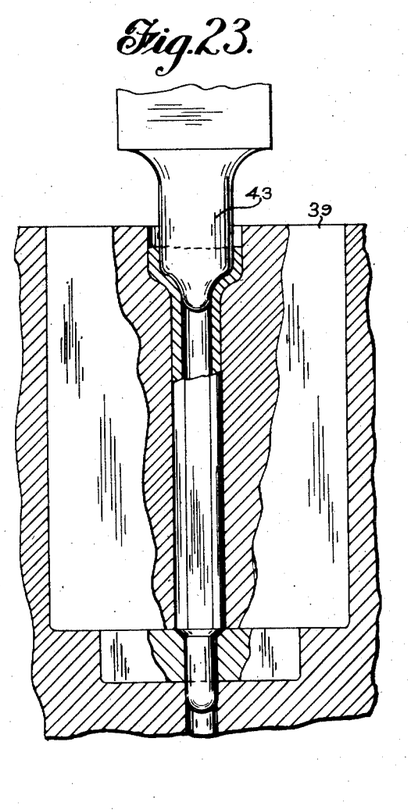

The shell may now be placed in the shouldered opening 38 of a die 39 and operated upon by a punch 40, as shown in Fig. 22, to turn outwardly or flare the wall adjacent the upper end thereof preparatory to forming the disk-like base upon this end of the product. The result of this operation is shown at 41, in Fig. 10. The wall at this point may be still further flared and the shoulder between the flared portion and the body of the shell made still sharper as shown at 42, in Fig. 11, by means of a further drawing operation, by means of the punch 43, shown in Fig. 22, the shell preferably remaining in the same die 39 in which the preceding operation was performed.

Figure 12:
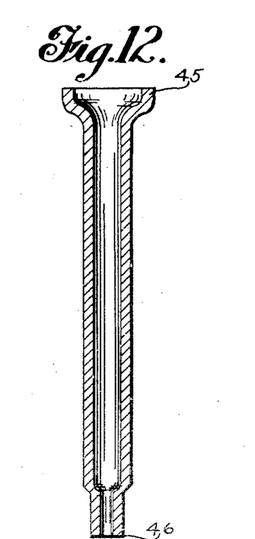
Fig. 12 is a sectional view of the blank shown in Fig. 11 after the upper and lower ends have been trimmed.
Figure 13:
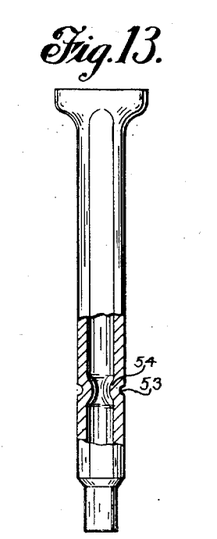
Fig. 13 is a side elevational view of the blank, partly in section, showing the inward displacement of the tube wall to provide the inner valve supporting shoulder.

The two ends of the shell may now be trimmed as shown at 45 and 46, in Fig. 12. This results in the cutting off of the closed end of the reduced portion of the shell so that the opening or bore will now extend entirely therethrough. It will be noted that when the shell has reached the stage of manufacture shown in Fig. 12, that it is in its final form as regards the external dimensions of its body; i. e., the flat sided portion of the shell is of the same cross sectional size as desired in the finished article, as is also the reduced end.

Figure 24:
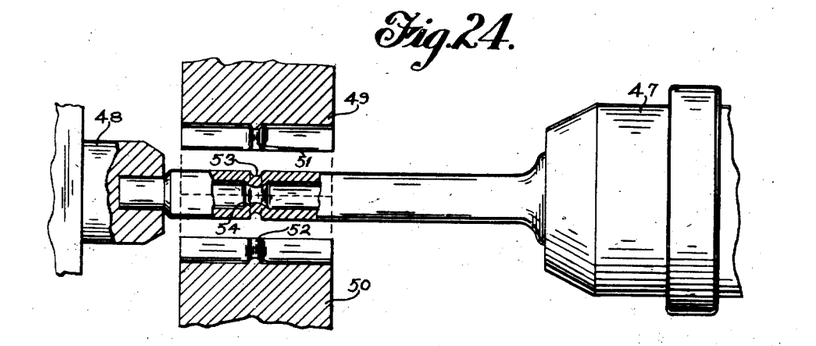
Fig. 24 shows the operation of displacing the wall of the tube to form the internal shoulder.

It will now be found expedient to form the interior valve supporting shoulder, and for this purpose the shell may be placed in the revolving chuck 47, shown in Fig. 24, while the other end is held in a suitable work holder 48.

It may then be operated upon by a suitable hammer 49, the portion of the blank being operated upon resting upon a suitable die 50. The hammer 49 is provided with a rib 51 and the die 50 provided with a similar rib 52. The shell is rotated while the hammer 49 is given a reciprocating movement and this operation results in the formation of an exterior annular groove 53, together with a corresponding internal shoulder 54 upon the shell.

Figure 14:
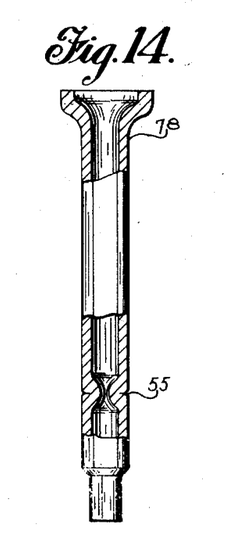
Fig. 14 is a view similar to Fig. 13 after the walls of the annular channel or groove have been closed.
Figure 25:
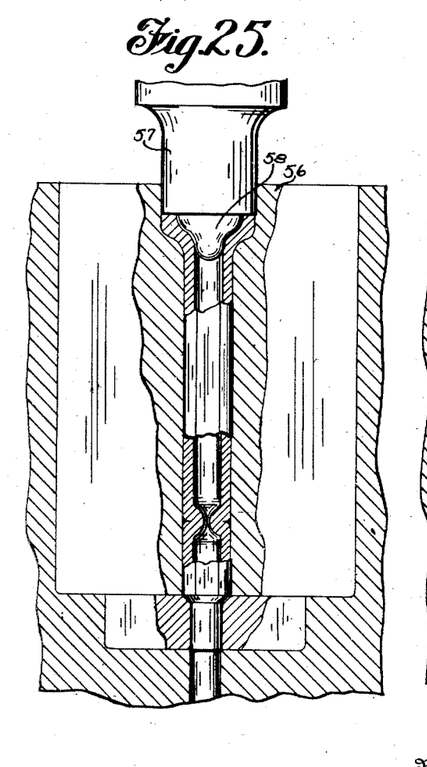
Fig. 25 is a view showing the operation of closing together the walls of the groove formed by the operation shown in Fig. 24.

The walls of the groove 53 may then be closed up as shown at 55, in Fig. 14. This is effected by placing the shell in a suitable die 56 and bringing down upon the upper end thereof a punch 57, provided with a suitably shaped tool projection 58. The lower end of the shell is suitably held against displacement while the punch is brought down forcibly upon the upper end, and as a result the walls of the groove are closed together effectually so that the exterior surface of the shell body is substantially continuous and smooth, the annular projection 54, however, still remaining within the tube bore.

Figure 15:
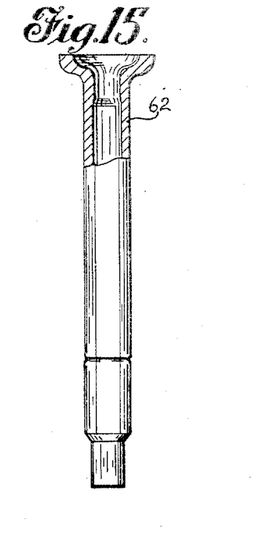
Figs. 15, 16 and 17 are elevational views, partly in section, showing successive stages in the formation of the disk-like base upon the end of the shell.
Figure 16:
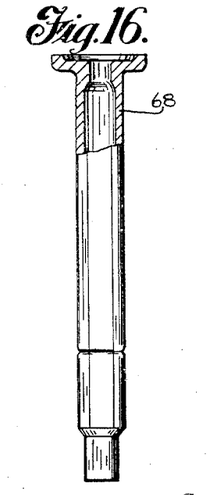
Figure 17:
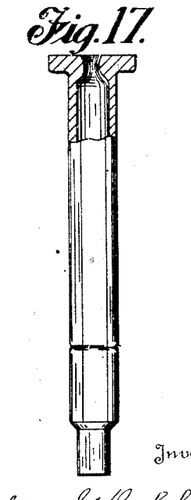
Figure 26:
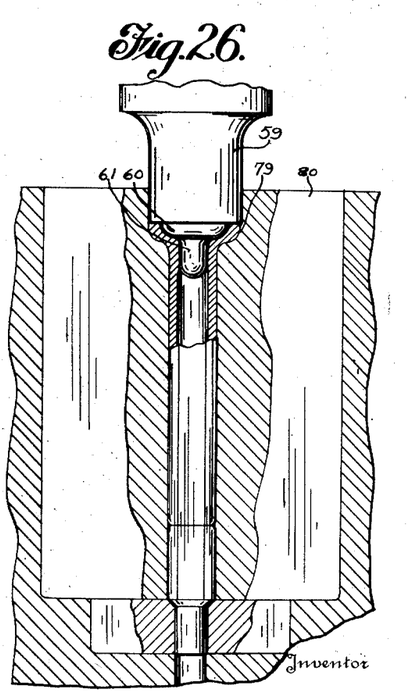
Figs. 26, 27 and 28 are views showing the method by which the disk-like base is formed at the end of the blank.
Figure 27:
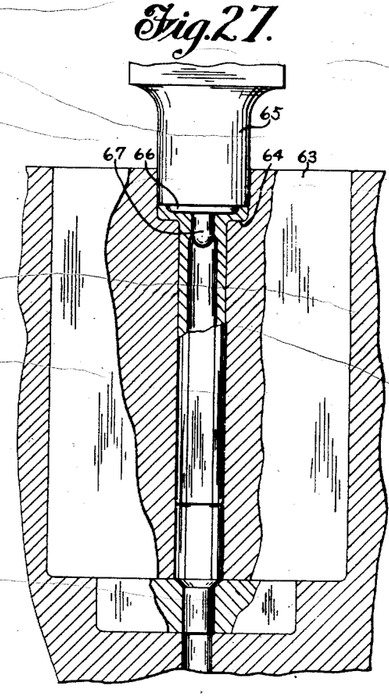
Figure 28:
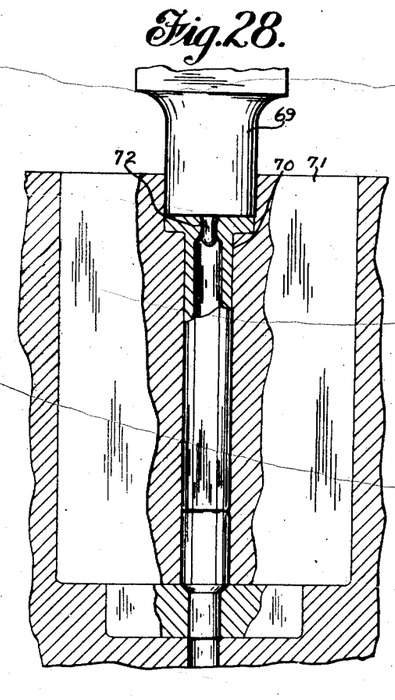

The formation of the single ply head upon the blank may now be expediently effected. For this purpose, the shell in the form shown at 78, in Fig. 14 is placed in a suitable shouldered die opening 79 in the die 80 of a punch press, shown in Fig. 26. The punch 59 bears a tool projection 60, which carries a pin 61, designed to enter the bore of the shell. When the punch 59 is brought down upon the work the flared wall of the blank is forced downwardly and the metal thickened, the bore at this portion being somewhat reduced in diameter about the pin 61. The shell which emerges from the die 80 in the form shown at 62, in Fig. 15, is then placed in a die 63, the opening of which has a relatively sharp or flat shoulder 64, and the punch 65 is brought down upon the work. The punch 65 has a tool projection 66 of less height than the projection 60 upon the punch 59, and is provided with a pin 67 to maintain the opening through the base or head upon the shell during the stamping operation. As shown at 68 in Fig. 16, the base is flattened out to a further extent and the metal caused to flow inwardly about the pin 67 to thicken the wall of the tube at this point. The completion of the head is then effected by means of the punch 69 operating upon the shell in the opening 70, in the die 71, the punch carrying upon its lower face a pin 72 to insure the maintenance of an opening through the formed head or base.

Figures 18, 20:
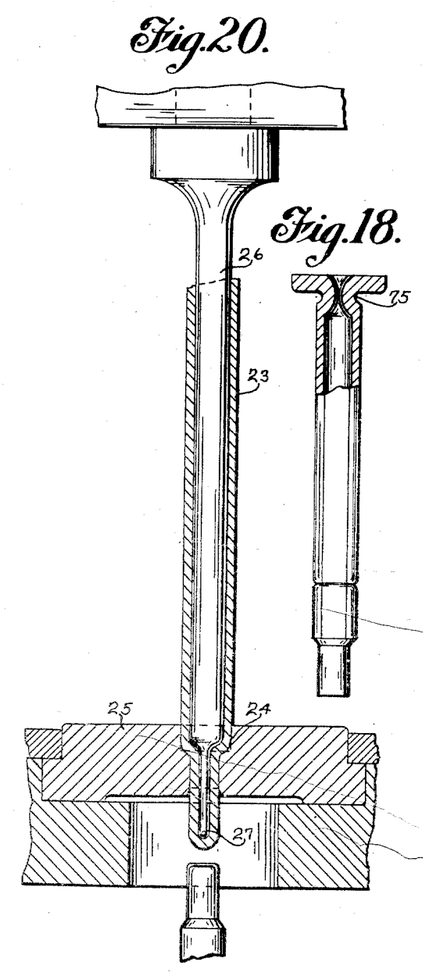
Fig. 18 is a similar view of the shell after the formation of the neck adjacent the disk-like base.
Fig. 20 is a somewhat fragmentary view of the mechanism used for forming the reduced upper neck upon the shell shown in Fig. 8.

The shell may then be placed in a rotating chuck 81 and operated upon by a hammer 82 provided with an arcuate rib 83, while supported at the other side by a die 73, provided with a similar rib 74. The result of this operation is to displace inwardly the wall of the shell adjacent the base to form the lower neck 75, as shown in Figs. 18 and 29.

Figures 29, 30:
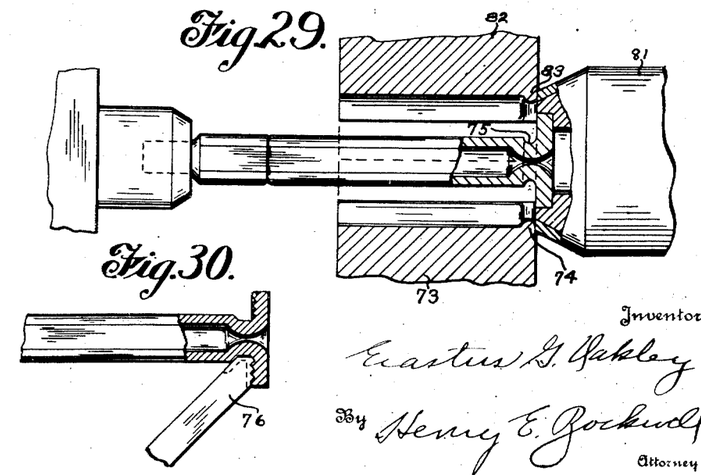
Fig. 29 is a view showing the operation of forming the reduced neck adjacent the base.
Fig. 30 shows the cutting or milling of the annular grooves or channels in the upper surface of the base.

The annular grooves or channels may then be cut in the upper surface of the base and the neck 75 finished by means of a suitable cutting tool 76, shown in Fig. 30, the shell being rotated in any suitable way against the tool. As shown at 77 in Fig. 19, the manufacture of the shell has now been completed and it only remains to cut the external and internal threads upon the body and neck thereof to make the completed stem ready for use, as shown in Figs. 1 and 2.

It will be, of course, understood that my improved method is not limited in all its aspects to the exact steps shown, or the order in which these steps are carried out, nor to the mechanism shown for performing the various operations. The particular method described is capable of modification and variation within the spirit of the invention and within the scope of the appended claims.

Figure 10:
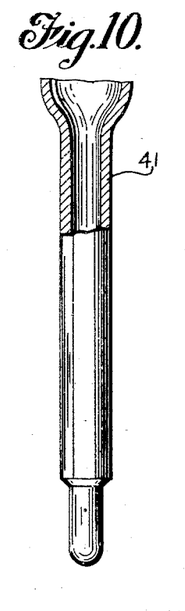
Figs. 10 and 11 are elevational views partly in section, of the blank at successive stages of the flowing outwardly or flaring of the upper portion to form the base.
Figure 11:
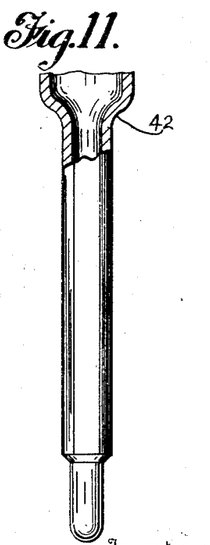

While in the particular embodiment of my improved method which I have described, a part of the process of forming the head upon the shell is performed before, and the remainder after the formation of the interior valve supporting shoulder, it will be understood that this particular sequence is not important in all aspects of the invention. It will be observed that the first steps in the formation of the head or base are performed by means of a tool which exerts lateral pressure interiorly upon the wall of the shell to cause the wall to flare outwardly adjacent the open end thereof, as shown in Figs. 10 and 11. After the flared wall has been trimmed at the upper end the completion of the head is effected by tools which exert pressure upon the upper edge of the flared portion in an axial direction to cause the metal in the flared portion of the shell wall to flow downwardly and laterally or inwardly to form the base. During this process, the wall is confined at its outer edge by the wall of the die opening and the metal is likewise, by means of the pins upon the punches, prevented from flowing inwardly to such an extent as to entirely close the opening through the shell, although this opening is considerably reduced in size. While thus confined by means of the wall of the die opening and the pins upon the punches, the metal in the flared portion of the shell will be caused to flow laterally or in a direction substantially transverse to the shell axis by means of the pressure in an axial direction thereupon, by the punches 59, 65 and 69.

What I claim is:

1. The process of making a valve stem or the like, which comprises drawing a cup-shaped blank into a long tubular flat-sided shell closed at one end and having its wall flared outwardly at the open end, and then upsetting said flared portion in an axial and radial direction to increase the thickness of said portion and press it into a flat disk-like head of uniformly increased thickness, relatively to the wall of the shell in a plane at right angles to the axis of the shell.

2. The process of making a valve stem or the like, which comprises drawing a sheet metal shell from a suitable blank, drawing opposite flat sides upon the shell so made, flaring outwardly the open end of the flat sided shell so formed, and then upsetting said flared portion into a flat circular disk-like base.

3. The process of making a valve stem or the like, which comprises drawing a sheet metal shell from a suitable blank, drawing opposite flat sides upon the shell so made, flaring outwardly the open end of the flat sided shell so formed, and then upsetting said flared portion into a circular disk-like base thicker than the shell wall.

4. The method of making a valve stem which comprises preparing a cup-shaped blank, drawing said blank into a relatively long tubular shell having flat sides and closed at one end, the wall of the shell at the other end being flared outwardly and of increased diameter relatively to the shell body, and then forcing, by further upsetting operations, the metal of the flared portion of the shell downwardly and laterally to form a flat disk-like base or head upon the shell extending in a plane at right angles to the shell axis while simultaneously causing the metal to flow to increase its thickness so that the resulting head is of increased thickness relatively to the shell wall, and preserving during the heading operation an opening through the formed head smaller than the bore of the shell body.

5. The method of making a valve stem or the like, which comprises drawing a sheet metal shell from a suitable blank, drawing opposite flat sides upon the shell so formed, flaring outwardly the metal at one end of the shell, and then upsetting the flared end of the shell into a flat circular disk-like base, and thickening said base by causing the metal of the flared portion of the shell to flow downwardly and laterally so that the resulting base is of uniform thickness greater than that of the shell wall.

6. The process of making a valve stem or the like, which comprises preparing a cup-shaped blank of relatively thick metal, drawing said blank into a relatively long sheet metal shell having flat sides and closed at one end, and having its wall adjacent the other end flared outwardly so that the diameter of the shell is increased at the open end, and then upsetting the metal in the flared portion of the wall downwardly and outwardly to form a thickened plane disk-like head of a thickness greater than the wall of the shell and joining the shell at a point of increased thickness of metal.

7. The method of making a valve stem or the like which comprises drawing from a suitable blank a flat sided tubular shell closed at one end, flaring outwardly the wall of the shell at one end of the blank, and upsetting said flared portion into a thick single ply disk-like head by exerting pressure thereon axially of the blank so as to cause the metal of the wall of the shell to flow downwardly and inwardly to form a flat base of uniform thickness greater than the shell wall, confining the metal of the base centrally of the bore of the shell to preserve the opening therethrough, and thereafter displacing inwardly the wall of the shell adjacent the base to form a lower neck.

8. The method of making a valve stem or the like from a drawn tubular shell, which comprises upsetting the metal adjacent the open end of the shell in a thick disk-like head while maintaining the tube opening therethrough, but reduced in size, and then displacing inwardly the shell wall adjacent the head to form a reduced neck.

9. The process of forming a valve stem or the like, which includes the step of forming a flat disk-like head upon one end of a tubular blank, which comprises flaring the wall of the tube outwardly adjacent one end thereof and causing the metal of said flared portion of the wall to flow downwardly and inwardly to form a flat head transverse to the tube axis.

10. The process of forming a valve stem or the like, which includes the step of forming a flat disk-like head upon one end of a tubular blank by causing the wall of the tube to be flared outwardly adjacent one end thereof by exerting lateral pressure interiorly upon the tube wall and then causing the metal in the portion so flared to flow downwardly and inwardly to form the head transverse to the tube axis while maintaining the tube opening through the head thus formed.

11. The process of forming a valve stem or the like, which comprises exerting pressure in a lateral direction upon, and interiorly of, the wall of a tubular blank to cause said wall to be flared outwardly adjacent one end of the blank and then applying pressure to said flared portion in a direction parallel to the tube axis to cause the metal of said flared portion to flow downwardly and laterally to form a disk-like base.

12. The method of making a valve stem or the like, which comprises cupping a sheet metal disk, drawing said cup into a tubular shell and then upsetting the metal at one end of the shell into a flat single ply disk-like base transverse to the tube axis.

13. The method of making a valve stem or the like, which comprises cupping a disk of sheet metal of the proper gauge, then drawing said cup into a tubular shell closed at one end, cutting off said closed end to perfect an opening through the shell, flaring the metal at one end of the shell into a bell shaped mouth, displacing the shell wall inwardly intermediate its ends to form an interior shoulder, applying pressure to the opposite ends of the shell to close together the walls at the point of said displacement, then applying pressure axially of the tube to the edge of the flared mouth to cause the metal of said flared portion to flow downwardly and inwardly to form a flat disk-like head.

14. The method of making a valve stem or the like which comprises cupping a sheet metal disc, drawing the cup into a tubular shell having a closed end portion of reduced cross-section, cutting off the terminal part of such end portion, and upsetting the metal at the other end of the shell to form a flat single-ply disc-like base transverse to the tube axis.

15. The method of making a valve stem or the like which comprises drawing from a suitable blank an elongated shell having a closed end portion of reduced cross-section and cylindrical shape, drawing flat sides upon the portion of greater cross-section, cutting off the terminal part of the reduced end portion, and upsetting the metal at the other end of the shell to form a flat thickened transverse base in the shape of a disc.

In witness whereof, I have hereunto set my hand this 30th day of June, 1923.

ERASTUS G. OAKLEY.